No. 832,201. PATENTED OCT. 2, 1906.
S. L. KISTLER.
DILATOR.
APPLICATION FILED DEC. 12, 1904.
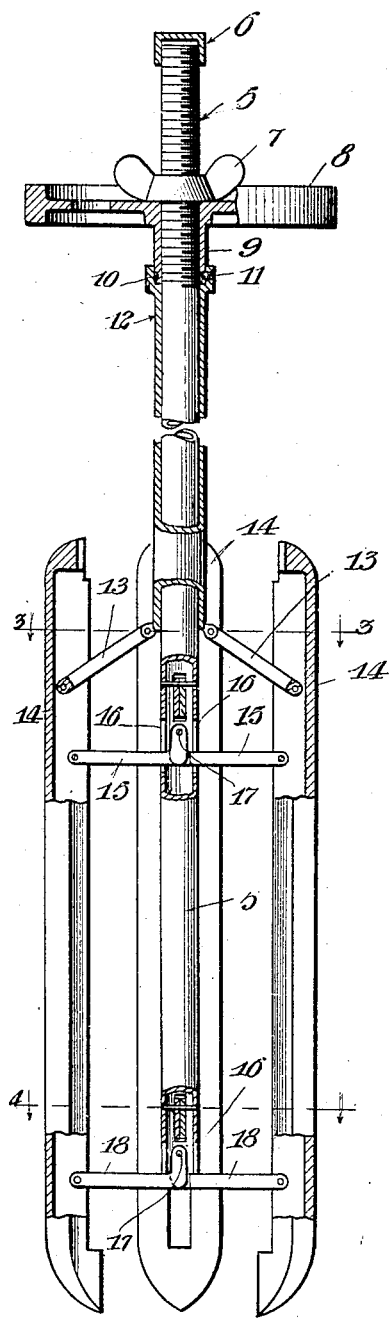
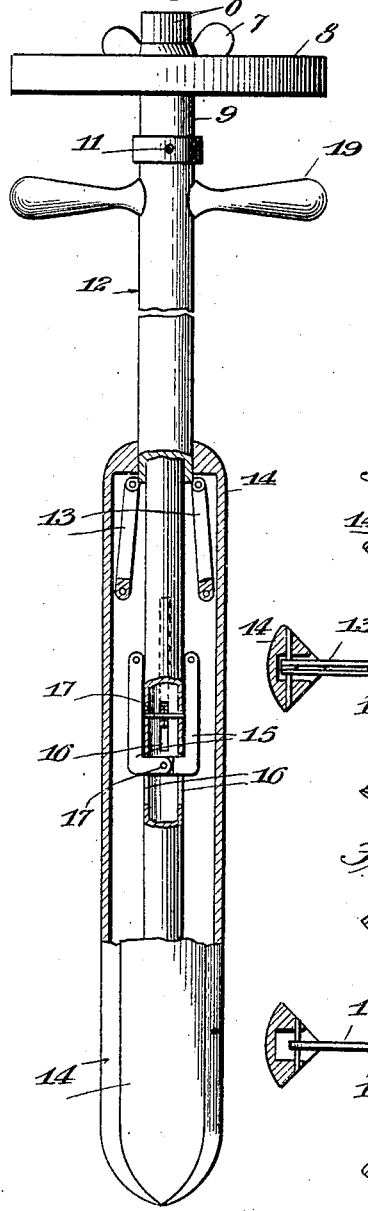
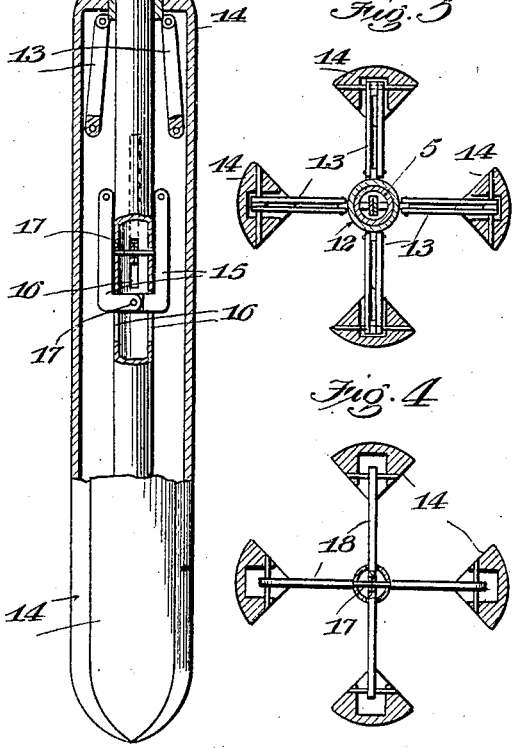
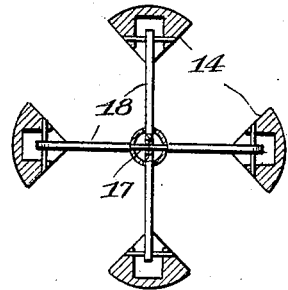
Witnesses
Inventor
Samuel L. Kistler
by Hazard & Harpham
Attorneys.
THE NORRIS PETERS CO., WASHINGTON, D. C.

UNITED STATES PATENT OFFICE.

SAMUEL L. KISTLER, OF LOS ANGELES, CALIFORNIA.

DILATOR.

No. 832,201.     Specification of Letters Patent.     Patented Oct. 2, 1906.

Application filed December 12, 1904. Serial No. 236,581.

*To all whom it may concern:*

Be it known that I, SAMUEL L. KISTLER, a citizen of the United States, residing at Los Angeles, in the county of Los Angeles and State of California, have invented new and useful Improvements in Dilators, of which the following is a specification.

My invention relates, primarily, to dilators for enlarging abnormal constrictions of the descending colon and rectal pouch, although it may be used for enlarging other constricted parts of the body; and the object thereof is to provide a simple and efficient instrument that may be easily inserted into the constricted organs and then gradually expanded and which may be rotated within the parts in which it is used when desired. I accomplish these objects by the instrument described herein and illustrated in the accompanying drawings, in which—

Figure 1 is a side elevation, partly in section and partly broken away, showing my dilator in its expanded position. Fig. 2 is a like view showing the parts in their closed position with a handle added. Figs. 3 and 4 are cross-sections on the lines 3 and 4, respectively, of Fig. 1.

The dilator consists of two telescoping members designated by a tube 5 and sleeve 12, which are preferably made hollow. The tube 5 is adapted to be received within the sleeve 12 and is screw-threaded at its outer end. An operating-wheel 8, which is threaded on the interior of the hub 9, is adapted to be received on the threaded portion of the tube 5. The hub 9 is provided at its forward end with an annular groove 10, which connects the sleeve 12 to the wheel 8 by means of the screw 11. At the other end of the sleeve 12 links 13 are pivotally secured which engage the expanding-ribs 14. Connected to the tube 5 just below the connection of the links 13 the L-shaped links 15 are secured, by means of a rivet 17, in the slots or sockets 16 by passing through the oppositely-disposed links and the walls of the tube, and the other ends of the links are secured to the ribs 14. At the lower end of the tube 5 similar L-shaped links 18 are secured in slots 16 by a rivet 17, and the other ends of the links are secured to the ribs 14.

When it is desired to use the dilator to expand a constriction of the colon, the expanding-ribs 14 are brought to a closed position, as shown in Fig. 2, the instrument is inserted in the colon to the part that is desired to be expanded when the wheel 8 is revolved, thereby forcing the ribs outward and expanding the colon, and when this is done the thumb-screw 7 is screwed down on the tube 5 against the wheel 8, so that the instrument can be rotated to cause the disengagement of the fecal matter from the walls of the colon. A cap 6 is screwed onto the outer end of the tube 5, and if it is desired to inflate the colon by means of air or to inject a liquid the cap 6 is removed and the air or liquid can be introduced through the tube. When the constricted portion has been treated, the expanding-ribs can be quickly brought together by rotating the wheel in the reverse direction and the instrument removed. If desired, handles 19 might be secured to the sleeve 12 and the expanding-ribs operated thereby by removing the screws 11 and 7.

It will be seen that I have provided an exceedingly simple device which can be easily operated and inserted to the affected parts of the colon and one which can be used for expanding other constricted portions of the body.

Having described my invention, what I claim as new, and desire to secure by Letters Patent, is—

1. A dilator comprising telescoping members, expanding-ribs, links 13, pivotally connected with the expanding-ribs and one of the telescoping members, L-shaped links 15 and 18 pivotally connecting the other telescoping member with the expanding-ribs, and means for moving one of said telescoping members endwise with respect to the other.

2. A dilator comprising telescoping members, one of the members threaded on its rear end, an operating-wheel received on the member, expanding-ribs secured to the member, links pivotally connected to said expanding-ribs near both ends thereof and to the member, the other member swivelly connected to said operating-wheel, and links pivotally connected to said member and to the rear ends of said expanding-ribs.

3. A dilator comprising telescoping members, one of the members threaded on its outer end, an operating-wheel, having the hub thereof internally threaded and adapted to be received on the member, a lock-nut on said member at the rear of the operating-wheel, expanding-ribs at the outer end of said member, links pivotally connected to said expanding-ribs near both ends thereof and to said member, and the other member slidably received upon said first-named member and swivelly connected to said operating-wheel, and links pivotally connected to said member and to the rear ends of said expanding-ribs.

4. The combination of the tube, the sleeve movable longitudinally thereon, the ribs, the links connecting the ribs with the sleeve, the links connecting the ribs with the tube and means for operating the sleeve.

5. The combination of the tube, the ribs, the sliding sleeve, expanding devices connecting the ribs and sleeve and the ribs and tube, whereby the ribs may be moved as a whole laterally from the tube.

6. The combination of the tube, a plurality of ribs arranged longitudinally of the tube, and means whereby the ribs may be moved as a whole laterally from the tube.

In witness that I claim the foregoing I have hereunto subscribed my name this 3d day of December, 1904.

SAMUEL L. KISTLER.

Witnesses:
G. E. HARPHAM,
MARGARETE C. NICKELESON.